(Model.)
C. G. SPALDING.
ADDING MACHINE.
No. 293,809. Patented Feb. 19, 1884.
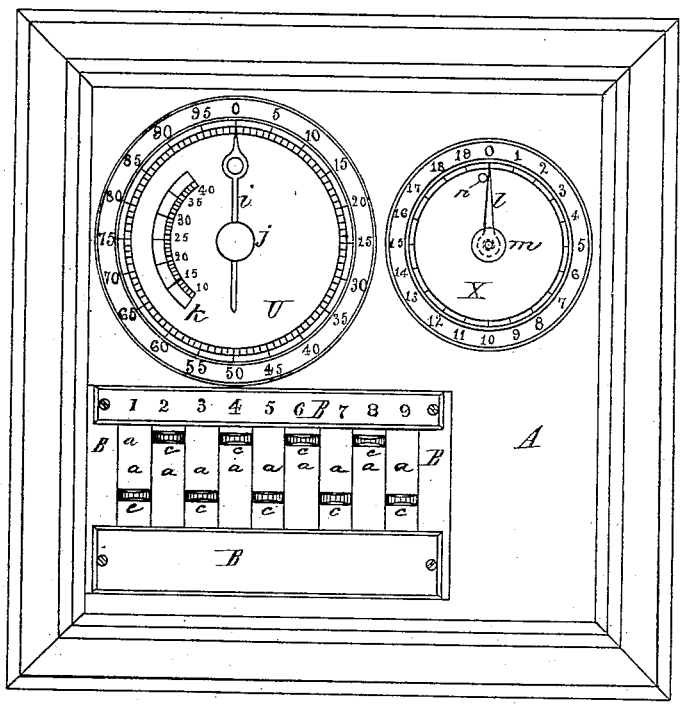
Fig. I
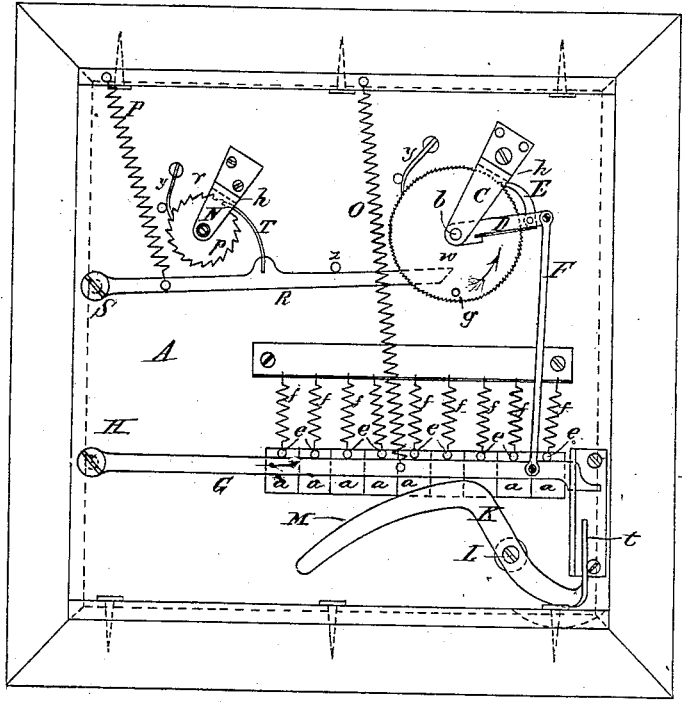
Fig. II
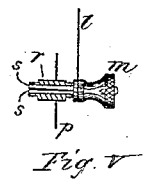
Fig. V
Witnesses:
T. A. Curtis.
C. S. Hurlbut.
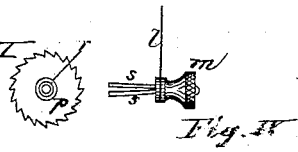
Fig. III    Fig. IV
Inventor.
Cyrus G. Spalding

UNITED STATES PATENT OFFICE.

CYRUS G. SPALDING, OF SPRINGFIELD, MASSACHUSETTS.

ADDING-MACHINE.

SPECIFICATION forming part of Letters Patent No. 293,809, dated February 19, 1884.

Application filed October 10, 1883. (Model.)

*To all whom it may concern:*

Be it known that I, CYRUS G. SPALDING, of Springfield, in the county of Hampden and State of Massachusetts, have invented a new and useful Improvement in Adding-Machines, of which the following is a specification and description.

The object of my invention is to provide a simple, cheap, and durable stop mechanism for controlling and limiting the movement of the slides or keys and the controlling-bar in an adding-machine, and also to provide suitable means for setting and moving the pointers or indexes on the dials when required, and I accomplish this by the mechanism substantially as hereinafter described, and illustrated in the accompanying drawings, in which—

Figure I is a front view of an adding-machine made according to my invention. Fig. II is a rear view of the same, showing the operating mechanism. Fig. III is a rear side view of the ratchet-wheel used for registering hundreds, showing an end view of its tubular shaft or journal. Fig. IV is a side view of the hundreds index or pointer having a moving button attached thereto and provided with the friction mechanism to be inserted into the tubular shaft or journal of the ratchet-wheel used to register the hundreds; and Fig. V is a sectional view of the tubular shaft or journal to which the ratchet-wheel used for registering the hundreds is secured, and the friction mechanism of the index or pointer inserted therein, which carries the said pointer or index and its button.

In the drawings, A represents the body of the machine, which consists of a plate made of any desired material and of suitable thickness, with the slides or keys $a$ arranged to move freely in suitable guideways, as B; and operated by pressing upon the projecting finger-pieces $c$; and the front side of this plate A is provided with a dial, U, which is divided into one hundred equal spaces around its outer portion, and with the points between these spaces properly numbered or indicated, and with a second graduated scale, $k$, conveniently placed on the left side of the center of the dial U, this scale $k$ being graduated or spaced and supplied with indicating characters or numerals to correspond with that portion of the spaces and indicating-characters located diametrically opposite said scale $k$ on the other side of the dial, the purpose of which will be hereinafter explained. A second dial, X, also divided into any desired number of equal spaces—say twenty—and supplied with corresponding indicating-characters, is made upon or secured to the front of the plate A, and a stop or projection, $n$, is fixed to this dial at a point so that an index or pointer, $l$, extending outward from the center of said dial X, may point to 0 or to the starting-point on said dial when the said index or pointer is moved against said stop $n$. A shaft or pivot, $b$, has a bearing at one end in a cock-bridge, C, secured to the back side of the plate A, and at the other end in a hole in the center of the dial U on the front side of said plate, and to this shaft or pivot $b$ is secured a ratchet-wheel, $w$, having one hundred teeth of equal size around its periphery, this wheel being arranged to revolve on its shaft or pivot $b$, between the cock-bridge C and the back side of the plate A. A pawl-arm, D, is pivoted to move on the shaft $b$, said arm extending beyond the periphery of the wheel $w$, with a pawl, E, pivoted to said arm and held in engagement with the teeth of the wheel $w$ by a spring secured to the pawl-arm or in any other convenient position, and a rod, F, is also attached at one end to this pawl-arm, and at the other end to a bar, G, arranged to move freely upon a pivot, as at H, with a spring, as at O, conveniently located to hold the said bar in its uppermost and horizontal position.

I prefer to make the cock-bridge C with a shoulder just outside the periphery of the wheel $w$, as indicated in dotted lines at $h$, so that when the bar G is moved upward by its spring O the end of the pawl E will impinge against said shoulder at $h$, and the point of said pawl will be securely locked into engagement with the teeth of the wheel $w$, so that the latter is thereby locked in position, and cannot be moved until the rod F and the pawl E are moved down. A pin or projection, $e$, extends outward from the rear side of each slide or key $a$, to which I attach a spring, $f$, properly secured to hold each slide in its highest position. The controlling-bar G, when in its highest position, extends horizontally with its upper edge against the pins $e$, projecting from the slides $a$, as shown in Fig. II. The vertical movement of the first two or three slides or keys $a$, on the left portion of Fig. I, is so short and limited that no perceptible momentum is given by them to the controlling-bar G, when said slides or keys are moved down quickly; but when any of the other slides or keys are moved down quickly, the greater length of their downward movement is liable to give sufficient momentum to the controlling-bar G to carry the latter downward farther than it would move when forced down slowly by the same slide or key, this bar being the common medium, in connection with the rod F, by which the pawl E is moved down to engage with the desired number of teeth on the wheel $w$, when either slide or key is moved down by the finger. To stop this momentum, and to cause the bar G to move down exactly the same distance when forced down by a slide, whether the latter be moved slowly or quickly, and to cause the extreme downward limit of movement of the bar G to be exactly coincident with the extreme downward limit of movement of either slide or key $a$, I pivot at L a stop-lever, K, whose upper edge of one arm in this case is curved, as at M, this arm of said lever being free to move up into the space between the bar G and the slides $a$, and the end of the other arm being bent or turned upward, as at $t$, so that its extreme end may be beneath and be struck by the lower edge of the bar G at its free end when the latter is moved down far enough.

A ratchet-wheel, $p$, having the same number of teeth round its periphery as there are spaces and indicating-characters around the dial X—say twenty—is secured to a tubular shaft, $r$, which has a bearing on one side of the ratchet-wheel in the cock-bridge N, and on the other side of the ratchet-wheel in the center of the dial X.

A bar, R, is pivoted at S, and is provided with a pawl, T, to engage with the teeth of the wheel $p$, and also a spring at P, to hold the said bar up against a stop at $z$, and a pin or projection, $g$, in the wheel $w$ moves against the free end of the bar R, when said wheel is turned in the direction indicated by the arrow, which moves the bar and its pawl $t$ downward to engage in the next lower tooth, the spring P moving the bar upward again, and moving said wheel $p$ forward one tooth at each revolution of the wheel $w$.

If desired, a safety dog or pawl, $y$, may be used to prevent each ratchet-wheel from revolving backward, as the operating-pawl is drawn back to engage with the lower teeth of either wheel.

The slides $a$ may be numbered, as 1, 2, 3, &c., from the left, in Fig. I; and as the first two or three slides are moved down—the length of their movement being comparatively short, and no perceptible momentum of the bar G being acquired—no stop for the bar G would be required when those slides are moved down; but as, say, the fourth slide $a$ from the left is moved down, its pin $e$ impinges against the upper edge, M, of the stop-lever K, and moves that part of the said lever down and the end $t$ upward until the latter strikes against the lower edge of the bar G at its free end, and of course, as the pin $e$ impinges against one arm of the lever K, and also against the upper edge of the bar G, and as the free end of the said bar G strikes against the end $t$ of the other arm of the same lever K, neither the slide nor the bar G can move any farther down; and if this is the fourth slide from the left, this downward movement of the slide and bar is just sufficient to move the pawl E past four teeth of the wheel $w$; if it is the fifth slide from the left, five teeth will be passed over by the pawl E; if the sixth, six teeth, and so on through the whole number of slides, whether they be moved down quickly or slowly. This operation follows when the front end of the lever, or that part to the left of the pivot, as shown in Fig. II, is heavier than the other end. If, however, the end to the right of the pivot be the heavier end, the operation of the lever will be reversed—that is, the lever G will first strike the end $t$ and depress it until it comes into contact with the pin $e$ on the slide, and so soon as both the pin and the arm G have a bearing upon the lever K the movement of both will be arrested. It will thus be seen that it is immaterial which end of the lever K is the heaviest, as the elevated end will be struck by one of the moving parts G or $e$, and the opposite end will be arrested by the other, the result in either case being the same. The position and form of the lever K is such as to permit each successive slide to drop one tooth lower—that is to say, its form and position is such that the bar G and pawl E will be moved downward, so that the latter will engage one tooth lower on the wheel $w$ at the downward movement of each slide in succession in the order in which they are numbered. When each slide is released and moves upward, the bar G being moved up by its spring O, the pawl E also moves up and rotates the wheel a distance corresponding to the space occupied by the number of teeth passed over, and of course causing the pointer $i$—which is secured to the shaft $b$—to move past a corresponding number of spaces on the dial U. If the first slide $a$ (designated as 1) on the upper guide-bar, B, be moved down and then released one hundred times in succession, the pawl E will engage with one hundred teeth, and move the wheel $w$ and the pointer $i$, secured to its shaft, one hundred times over a corresponding space on the dial, and the space the wheel is moved each time will be indicated by reading the indicated point on the dial to which the pointer or index is directed, taking care, of course, to set the index $i$ at zero previous to commencing the movement of the slides downward. Suppose, for example, that the slides marked 9 7 6 8 3 be moved down in succession, the index or pointer $i$ having first been set at zero. The index or pointer will be directed to the point 33 on the dial after this movement of the slides, that being the sum of the numerals 9 7 6 8 3.

Both pointers $i$ and $l$ are of course set at zero before the machine is used. When the index or pointer $i$ is set at zero, the pin $g$ on the wheel $w$ is diametrically opposite, and if any number of slides are moved down whose indicating-numerals shall amount to more than one or more hundreds, the pin $g$ will ride against and over the free end of the bar R, tilting the latter and moving the wheel $p$ and the pointer $l$ a corresponding distance, which will be indicated on the hundreds-dial X. Of course, when the button $j$ on the pointer $i$ is seized with the thumb and finger to turn or set the pointer $i$, most of the indicating-numerals, from 10 to 40, on the right side of the dial could not be seen, as the hand of the operator would hide them. To obviate this trouble I make the scale $k$, hereinbefore described, and extend the pointer $i$ a short distance on the opposite side of the button $j$; and if this short extended part of the pointer be set at any one of the indicating-numerals on the scale $k$ the pointer $i$ will be found pointing to the corresponding numeral on the right hand of the dial U. This arrangement greatly facilitates the setting of the pointer or index at each successive addition of columns of figures.

In setting the pointer $i$ to any desired indicating character or numeral on the dial, with the pawl E locked against the wheel $w$ by the shoulder $h$ on the cock-bridge C, as the button $j$ and pointer are secured to the wheel $w$, one of the stops $a$ may be drawn down, the pointer turned to the graduated place indicated 98 or 99, and the first slide or key moved down again to move the pointer to zero; but to set the pointer or index $l$ on the dial X, as the wheel $p$ cannot be turned back, I make a split rod, $s$, or a rod divided longitudinally and somewhat elastic, projecting from the inner side, and these parts slightly opened or apart from each other at their ends, as shown in Fig. IV, and by forcing these parts $s$ together and inserting them into the tubular shaft $r$ of the wheel $p$, at the center of the dial X, any movement of the wheel $p$ will then move the pointer $l$ and button $u$ by the friction of the divided rod $s$ within the tubular shaft.

When the operation of adding is completed, the button $u$ and pointer $l$ may be turned backward, with the pointer in position against the side of the stop $n$, and pointing to zero, by turning the divided rod $s$ within the tubular shaft $r$. This stop $n$ greatly facilitates the resetting of the pointer $l$ to zero, because when the pointer is turned backward by its button $u$ until it strikes the stop $n$ the pointer will be known to point to zero without even looking at it to see.

I am aware that adding-machines have heretofore been made and used—as, for example, that shown in the patent granted to me January 13, 1874, upon which this is an improvement, as the mechanism hereinbefore described in this application is much more simple, and is very accurate, and is not so liable to get out of order.

Having thus described my invention, what I claim as new is—

In an improved adding-machine, the combination of the slides or keys, each provided with a projection on its rear side, the pivoted controlling-bar G, against which the said projections have a bearing, and a pivoted stop-lever, K, against one arm of which said projections strike, and against whose other arm the said pivoted controlling-bar strikes when the said slides are moved downward, whereby the limit of the downward movement of the said slides and said bar is made coincident and positive, substantially as described.

CYRUS G. SPALDING.

Witnesses:
T. A. CURTIS,
C. S. HURLBUT.